United States Patent
Yang et al.

(10) Patent No.: US 7,437,525 B2
(45) Date of Patent: Oct. 14, 2008

(54) GUARANTEED UNDO RETENTION

(75) Inventors: Wanli Yang, San Mateo, CA (US);
Bipul Sinha, Foster City, CA (US);
Amit Ganesh, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 704 days.

(21) Appl. No.: 10/920,874

(22) Filed: Aug. 17, 2004

(65) Prior Publication Data

US 2005/0015563 A1 Jan. 20, 2005

Related U.S. Application Data

(60) Provisional application No. 60/559,280, filed on Apr. 2, 2004.

(51) Int. Cl.
*G06F 12/16* (2006.01)

(52) U.S. Cl. .......................... 711/162; 714/19; 707/202

(58) Field of Classification Search .................. 714/19; 711/162; 707/202
See application file for complete search history.

(56) References Cited

U.S. PATENT DOCUMENTS

| | | | |
|---|---|---|---|
| 5,524,205 A | 6/1996 | Lomet et al. | |
| 5,636,360 A | 6/1997 | Courts et al. | |
| 5,933,840 A | 8/1999 | Menon et al. | |
| 5,990,906 A | 11/1999 | Hudson et al. | |
| 6,185,663 B1 | 2/2001 | Burke | |
| 6,295,610 B1 | 9/2001 | Ganesh et al. | |
| 6,324,620 B1 | 11/2001 | Christenson et al. | |
| 6,324,654 B1 | 11/2001 | Wahl | |
| 6,374,264 B1 | 4/2002 | Bohannon et al. | |
| 6,453,383 B1 | 9/2002 | Stoddard et al. | |
| 6,526,416 B1 | 2/2003 | Long | |
| 6,675,321 B1 | 1/2004 | Beaven et al. | |
| 6,732,124 B1 * | 5/2004 | Koseki et al. | 707/202 |
| 7,143,317 B2 * | 11/2006 | Lyle et al. | 714/45 |
| 2002/0099843 A1 * | 7/2002 | Fruchtman et al. | 709/232 |
| 2003/0065883 A1 | 4/2003 | Bachmat | |

OTHER PUBLICATIONS

IBM Technical Disclosure Bulletin "Circular Database Log With Dynamic Allocation and Deallocation", vol. 32, No. 8A, IBM Corp. Jan. 1990.

* cited by examiner

*Primary Examiner*—Matt Kim
*Assistant Examiner*—Shane M. Thomas
(74) *Attorney, Agent, or Firm*—Hickman Palermo Truong & Becker LLP

(57) ABSTRACT

Techniques are provided for guaranteed undo retention. The techniques include a database server attempting to store undo information in undo storage. In order to store the undo information, the database server may overwrite expired undo records; write to empty undo extents; allocate new undo extents and write to the newly-allocated extents; or overwrite unexpired undo records that do not have guaranteed undo retention. If an undo record does not have guaranteed undo retention, then the undo record may be overwritten before the expiration time has elapsed. If no undo extent is empty or unallocated, and if all of the undo records are unexpired and have guaranteed undo retention, then the database system has, at least temporarily, run out of usable and reusable space and an error may be reported to an appropriate party.

40 Claims, 5 Drawing Sheets

High Water Mark Pointer 235

GUARANTEED UNDO RETENTION

RELATED APPLICATIONS AND CLAIM OF PRIORITY

This application claims benefit of U.S. Provisional Application No. 60/559,280, filed on Apr. 2, 2004, entitled "GUARANTEED UNDO RETENTION," by Wanli Yang et al., the entire contents of which are incorporated by reference for all purposes as if originally set forth herein, referred to herein as to '280.

This application is related to U.S. patent application Ser. No. 09/872,243, filed on May 31, 2001, which issued as U.S. Pat. No. 7,047,386 on May 16, 2006, entitled "DYNAMIC PARTITIONING OF A REUSABLE RESOURCE," by Gary Ngai et al, the entire contents of which are incorporated by reference for all purposes as if originally set forth herein, referred to herein as to '243.

This application is related to U.S. Pat. No. 6,574,717 B1 entitled "TECHNIQUES FOR TIME-BASED RETENTION OF A REUSABLE RESOURCE," filed by Gary Ngai et al on May 31, 2001, the contents of which are herein incorporated by reference for all purposes as if originally set forth herein, referred to herein as to '717.

FIELD OF THE INVENTION

The present invention relates to storing undo records. The invention relates more specifically to guaranteed undo retention.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application merely by virtue of their inclusion in this section.

Relational database management systems (RDBMS) store information in tables, where each piece of data is stored at a particular row and column. Information in a given row generally is associated with a particular object, and information in a given column generally relates to a particular category of information. For example, each row of a table may correspond to a particular employee, and the various columns of the table may correspond to employee names, employee social security numbers, and employee salaries.

A user retrieves information from and makes updates to a database by interacting with a database application. The user's actions are converted into database operations by the database application. Multiple database operations may be part of a "database transaction". Database transactions might involve hundreds or millions of operations and take minutes or hours to complete. If a transaction does not complete successfully, then the data in the database is in an interim state that is not planned and that is not desired. It is therefore useful for the database server to generate and store in an undo storage space an undo log containing undo records that indicate undo operations that may be performed to reverse the operations performed during the database transaction. Then, if the transaction fails to complete successfully, changes made by the database operations from the database transaction that have already been executed can be undone by performing the undo operations associated with the database operations. After the transaction completes, or after the unsuccessful transaction is undone, the undo data in the storage is considered obsolete and the storage allocated to the undo data may be re-allocated to another transaction.

Additionally, the information in the undo log for a database transaction may be used to provide consistent reads of data in a database. A consistent read allows a user of the database to query a database even if database transactions change the data in the database. The consistent read is designed to provide data from the database that reflects the last planned state of the database at the time the database query is initiated. In performing a consistent read, the database server handles data involved in an ongoing database transaction by using the undo log in the undo storage to determine the state of the database before the database transaction began executing. For example, a complex database query (which involves only database reads) involving thousands of rows of one or more tables may require minutes to complete. The database query may progress even if a database transaction has changed a particular row (or rows) on which the database query relies between the time the database query is initiated and the time the database query accesses the particular row. When accessing the particular row for the database query, the database server determines that the row has been changed since the start of the database query and uses undo information in the undo log to reconstruct the state of the row at the time the database query was initiated.

Storing undo information may be beneficial. A key consideration, however, is determining how much undo information to store. In a "store-all" approach to maintaining undo information, a database server stores undo information for every database operation that has occurred. A problem with the store-all approach is that, since the amount of stored undo information will grow indefinitely, storing the undo information places an undo burden on system resources, and in particular, the non-volatile memory, at the database server.

In a fixed-size approach, a fixed amount of non-volatile memory is dedicated to storing undo information. A problem with the fixed-size approach is that it provides no guarantee that a given piece of undo information will be available when it is needed.

Therefore, there is clearly a need for techniques that overcome the shortfalls of the approaches described above.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for guaranteed undo retention is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Introduction

The techniques described herein are in no way limited to any particular embodiment or aspect of an embodiment. In one example embodiment, undo information is received at or generated by a database server. Undo information is stored as undo records in undo storage. The undo storage may be an undo tablespace consisting of one or more undo segments. Each undo segment may be made up of one or more undo extents. The undo extents may correspond to different sized memory blocks. The undo records may have guaranteed undo retention. The guaranteed undo retention ensures that an undo record will not be overwritten before its "expiration time" has elapsed.

In the techniques described herein, the database server attempts to store undo information in the undo storage. In order to store the undo information, the database server may overwrite expired undo records; write to empty undo extents; allocate new undo extents and write to the newly-allocated extents; or overwrite unexpired undo records that do not have guaranteed undo retention. If an undo record does not have guaranteed undo retention, then the undo record may be overwritten before the expiration time has elapsed. If no undo extent is empty or unallocated, and if all of the undo records are unexpired and have guaranteed undo retention, then the database system has, at least temporarily, run out of usable and reusable space and an error is reported to an appropriate party.

System Overview

Figure 1:
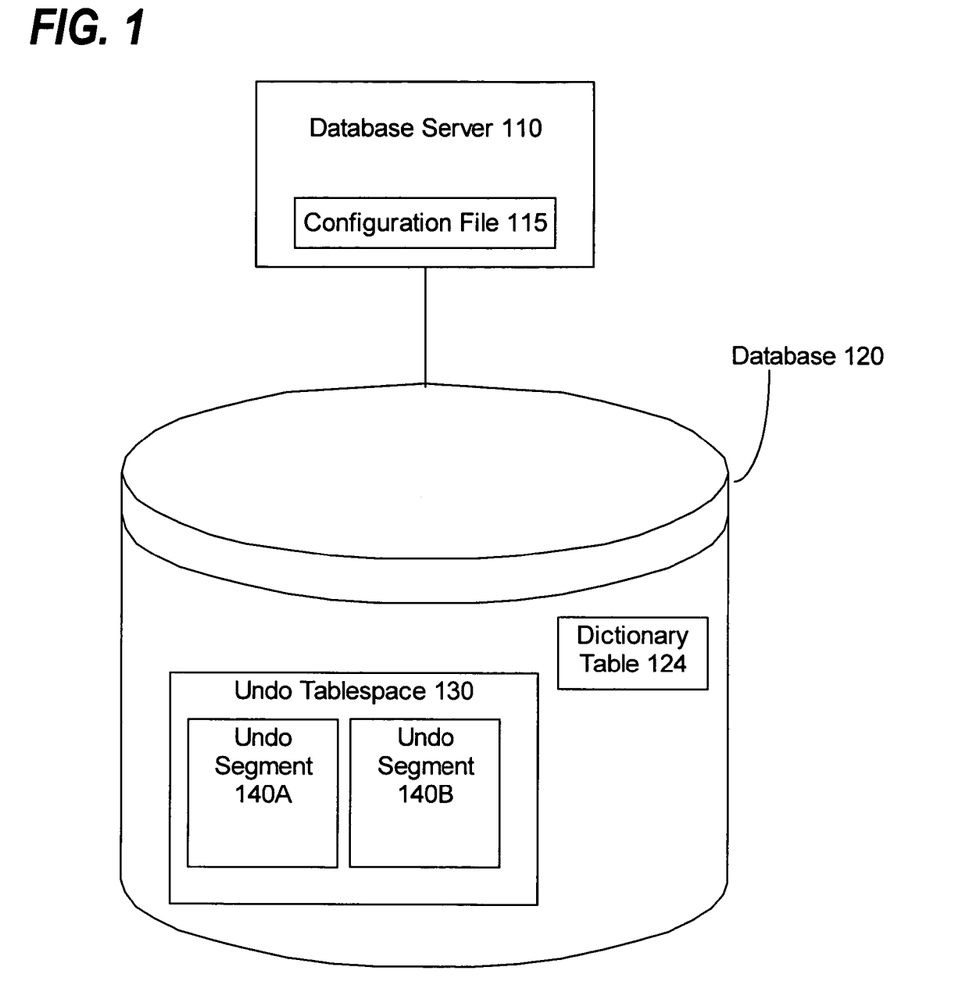
FIG. 1 is a block diagram that depicts a system for guaranteed undo retention.

FIG. 1 is a block diagram that depicts a system for guaranteed undo retention.

A database server 110 is communicatively coupled to a database 120. Each of the database server 110 and the database 120 is a logical machine. Each logical machine may run on separate physical computing machines or may be running on the same physical computing machine as one or more of the other logical machines. Various embodiments of computers and other physical and logical machines are described in detail below in the section entitled Hardware Overview. In various embodiments, coupling is accomplished by optical, infrared, or radio signal transmission, direct cabling, wireless networking, local area networks (LANs), wide area networks (WANs), wireless local area networks (WLANs), the Internet, or any appropriate communication mechanism.

In the embodiment described herein, the database server 110 runs on a particular physical machine and the database 120 is stored in a machine-readable medium that is accessible to the particular physical machine. The database server 110 receives database operations from database applications or from a command line interface and performs the database operations on the database 120. The database 120 may be a relational database, an object relational database, an Extensible Markup Language (XML) repository, or any other appropriate data storage mechanism. The database server 110 may be a relational database server, an XML-enabled relational database server, or any other appropriate process or set of processes that is capable of performing operations on the database 120.

The database server 110 includes a configuration file 115. The configuration file 115 is a file stored on disk. Alternatively, the configuration information could be stored in a database table stored in the database 120, or in any other appropriate non-volatile storage. The configuration file 115 may contain myriad information, including the size of the undo tablespace 130 associated with the database server 110 and an indication of whether the undo tablespace 130 has guaranteed undo retention.

The database 120 includes a dictionary table 124 and an undo tablespace 130. The undo tablespace 130 includes one or more undo segments 140A and 140B. Each undo segment 140A and 140B includes a set of extents. Each transaction typically uses one undo segment. The dictionary table 124 is used to keep track of the areas of non-volatile storage (such as underlying disk space) devoted to tables, indexes, and the undo tablespace 130. A database server 110 uses the information in the dictionary table to determine how to access the tables, indexes, and the undo tablespace 130.

In FIG. 1 a single database server is shown communicatively coupled to a single database 120. The techniques described herein are not limited to such an arrangement. Multiple database servers 110 may be coupled to a single database 120 and the database 120 may also be a distributed database or a replicated database. In the case where there is more than one database server 110 for a particular database 120, then there may be an undo tablespace 130 corresponding to each particular database server 110, or the particular databases 120 may share one or more undo tablespaces 130.

Example Undo Segment Data Structure

Figure 2A:
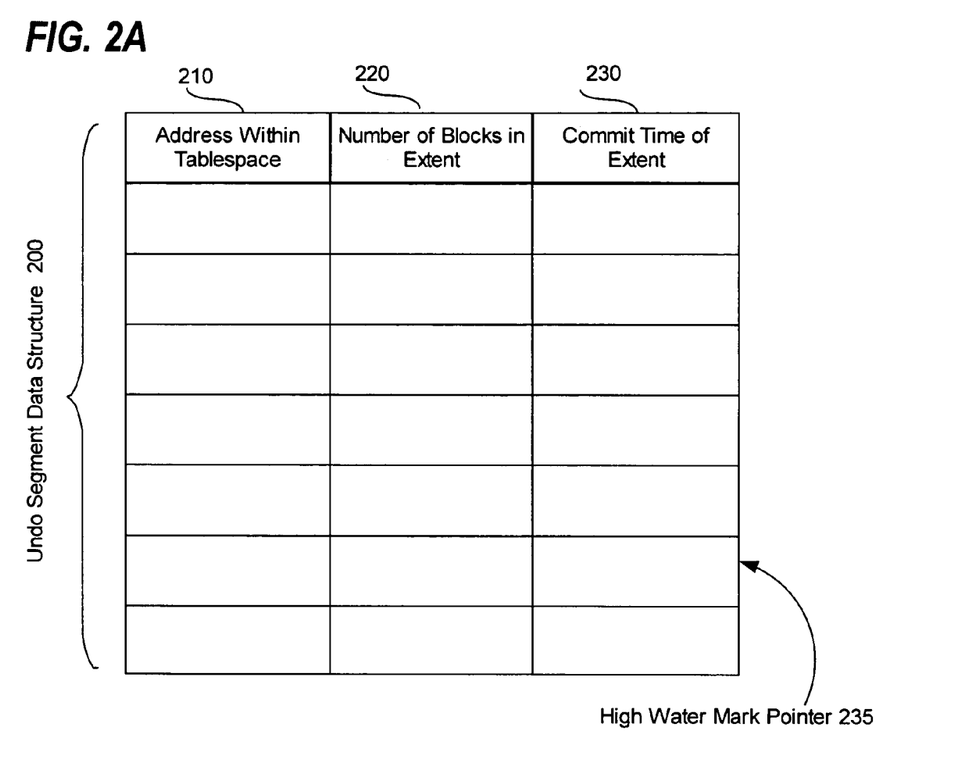
FIG. 2A is a block diagram that depicts an example data structure for an undo segment.

FIG. 2A is a block diagram that depicts an example data structure for an undo segment.

The undo segment data structure 200 includes an address column 210, a number of blocks column 220, and a commit time column 230. Each undo segment 140A and 140B has a corresponding undo segment data structure 200. Each row in the undo segment data structure 200 corresponds to a different undo extent. Undo extents are described in detail below with respect to FIG. 2B.

The value in the address column 210 for a particular row signifies the address of the undo extent for that particular row. The address defines the location of the undo extent within the tablespace. For example, if the tablespace is broken up into multiple equally-sized data blocks, then the "address" for a particular undo extent may be the "count" of data blocks before the initial data block for the particular undo extent. The value in the number of blocks column 220 indicates how many data blocks are associated with the undo extent. For example, if the address of the undo extent (from column 210) is 700 and the number of blocks in the undo extent is four (from column 220), then the undo extent spans data blocks 700, 701, 702, and 703.

Figure 2B:
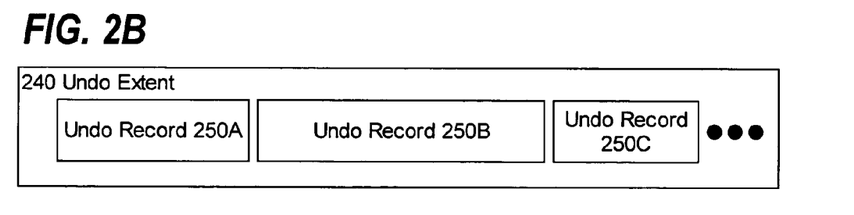
FIG. 2B is a block diagram that depicts an undo extent.

The value in the commit time column 230 is the commit time for the undo extent referred to by the corresponding value in the address column 210. The commit time for an undo extent may be determined in a number of ways. For example, if there are three undo records 250A, 250B and 250C in an undo extent 240 (see FIG. 2), then the commit time could be calculated as any one of the following: (1) the earliest commit time of any of the undo records 250A, 250B or 250C; (2) the latest commit time of any of the undo records 250A, 250B or 250C; (3) the average of the commit times for the undo records 250A, 250B and 250C; (4) if all of the undo records 250A, 250B and 250C are part of the same database transaction, then the commit time of the database transaction; or (5) any other appropriate time. For example, if all of the undo records 250A, 250B and 250C are part of the same, uncommitted database transaction, then the commit time stored in the commit time column could be the most recent execution time of an undo record 250A, 250B and 250C. Once the database transaction commits, then the value in the commit time column 230 may be updated to reflect the commit time of the database transaction.

The undo segment data structure 200 also includes a high-water-mark pointer 235. The high-water-mark pointer 235 indicates which row contains the undo extent that was modified most recently. The undo segment data structure 200 may be a cyclical list. That is, the first row is considered "before" the second row; the Nth row is before the (N+1)th row; and the last row is before the first row.

The undo segment data structure may also include a special header row that is not considered as one of the rows that refer to extents. The header row may include an indication of the number of rows included in the segment and other segment-related information.

Undo Extents

FIG. 2B is a block diagram that depicts an undo extent 240. The size of an undo extent 240 is defined by how many data blocks have been allocated to the undo extent. One data block corresponds to a specific number of bytes of physical space on the non-volatile media on which the database's 120 data is stored. An undo extent 240 may consist of contiguous data blocks.

The undo extent 240 includes zero or more undo records 250A, 250B, and 250C. Each undo record 250A, 250B, and 250C stores undo information for a particular database operation or set of database operations. The length of an undo record 250A, 250B, or 250C is defined by the space necessary to store the undo operations included in the undo record.

Functional Overview

Figure 3A:
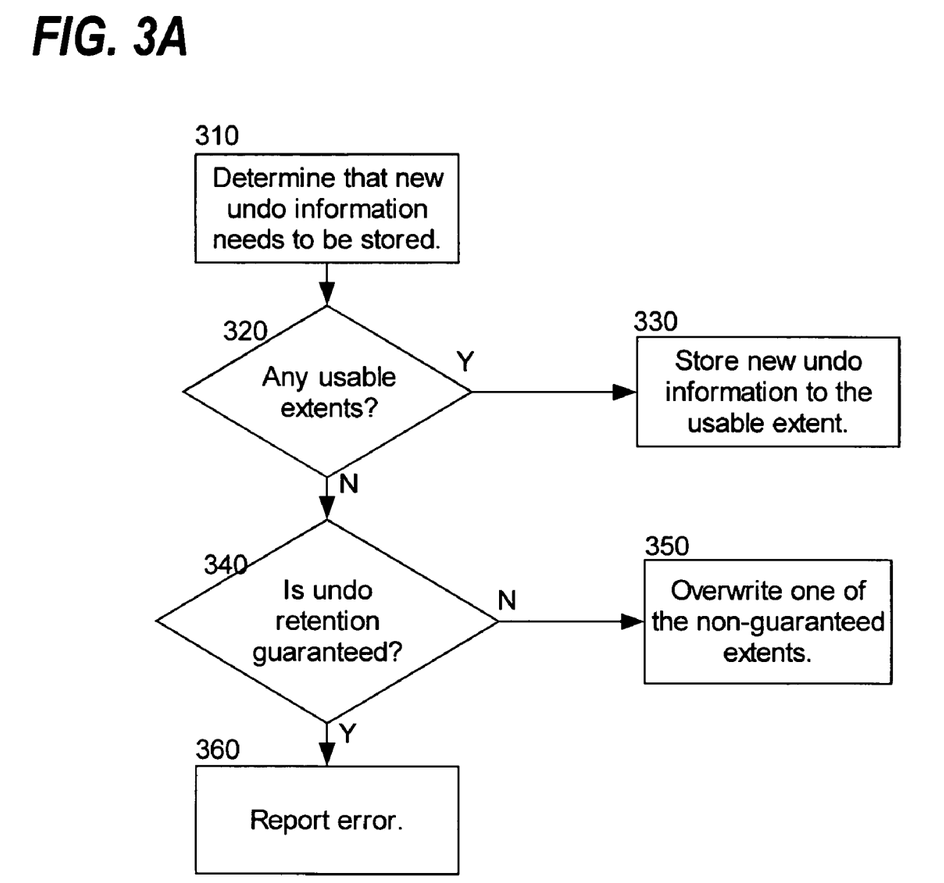
FIG. 3A is a flow diagram that depicts a "find usable extents first" technique for processing undo information.

FIG. 3A is a flow diagram that depicts a "find usable extents first" technique for processing undo information.

In step 310, a determination is made that new undo information needs to be stored. The undo information may be received from an external application at the database server 110 or generated by the database server 110 based on one or more database operations performed by the database server 110.

In step 320, a check is performed to determine whether there are any usable undo extents. In various embodiments, a "usable" undo extent may be an undo extent that contains expired undo records; an undo extent that is currently storing no undo records; an undo extent for which memory is allocatable, but has not yet been allocated; and any other appropriate undo extent. Alternatively, a usable undo extent may be one that contains undo records that are in a usable state. An undo record in a usable state may be an expired undo record (as noted above), an empty undo record, or an undo record in any other appropriate state.

Determining whether there are any usable undo extents may include performing checks for one or more of the types of usable undo extents. That is, some embodiments of the techniques described herein include checking for only one type of usable undo extent—for example, extents that contain expired undo records. Other embodiments include checking for multiple types of usable undo extents—for example, checking for undo extents that contain expired undo records and for empty undo extents. The techniques described herein are in no way limited to checking for a particular type of usable undo extent nor are they limited to a particular ordering of checking for particular types of usable undo extents.

Performing the checks to determining whether there are usable undo extents are usable may be accomplished in any appropriate manner. For example, in the context of FIG. 1 and FIG. 2B, an undo tablespace 130 has associated with it a bit map that indicates whether each data block in the undo tablespace 130 has already been used in any undo extent 240. Consider a scenario in which a check needs to be performed to determine whether there is a usable undo extent with a size of three data blocks. Determining whether there are any "empty" undo extents of the appropriate size comprises checking the bit map to determine which data blocks have not been allocated. If there are three contiguous unused data blocks, then these data blocks can be used as a new undo extent, and, therefore, there is a usable undo extent. If there are not three contiguous data blocks, then there is not an empty undo extent.

Another example of checking for usable undo extents includes determining whether there are any "expired" undo extents. Determining whether there are any expired undo extents may comprise checking all of the undo extents that are currently in use to determine whether there is an undo extent of the appropriate size that has expired.

Alternatively, consider an embodiment where the undo segment data structure 200 includes a high-water-mark pointer 235, which points to the most recently modified extent. In this embodiment, the row after the high-water-mark pointer 235 corresponds to the undo extent that was modified the longest ago, called herein "the segment's oldest undo extent." Determining whether there are any expired undo extents for the segment is accomplished by simply checking the segment's oldest undo extent. If the oldest undo extent is not expired, then none of the undo extents in the segment are expired. Therefore, performing the check to determine whether there are any usable undo extents in the undo tablespace 130 may include checking, for each segment in the undo tablespace, the segment's oldest undo extent. If one of the segments' oldest undo extents is expired (and of the appropriate size), then the undo extent is considered usable. If none of the oldest undo extents are expired, then there are no expired undo extents in the undo tablespace 130. In the case where a segment's oldest undo extent is expired but is not of the appropriate size, then one or more of the other undo extents in that segment (or other segments) are also checked for expiration. If other undo extents in the segment are expired, then the one of the other expired undo segments may be considered usable (if it is of appropriate size) or two or more expired undo extents, in combination, may be considered usable if they are large enough to store the undo information when combined.

In one embodiment, the check to determine whether there are any usable undo extents includes determining whether there are any undo extents for which memory is allocatable but has not yet been allocated. For example, consider an undo tablespace 130 that is auto-extensible. The undo tablespace 130 has an initial, minimum memory size, and a maximum memory size. Initially, storage that is the size of the minimum memory size is allocated on disk (or other non-volatile memory) at the database 120. As more undo extents are needed in the undo tablespace 130, more memory is allocated. Therefore, checking to determine whether there are any usable undo extents may include determining whether there is space left to be allocated in an auto-extensible undo tablespace 130. If there is space left to be allocated that is ample enough for an undo extent, then there is a usable undo extent.

In the examples above, an undo extent is considered usable if all of the undo records it contains are expired. In other embodiments, an undo extent may be usable if even a single undo record contained therein is expired. In such a case, the value in the commit time column 230 for that extent may be the commit time for the "oldest" undo record. Writing to the usable undo extent (step 330 below) may then include overwriting the expired undo record or overwriting other undo records in the undo extent.

If there are usable undo extents, then in step 330, the new undo information is stored to the usable undo extent. In the case where a usable undo extent is currently empty, the new undo record is written in the empty data blocks of the undo extent. In the case where the undo extent contains expired undo records, storing the new information to the undo extent includes overwriting one or more of the expired undo records.

In one embodiment, if there may be multiple undo records in the usable undo extent, then the existing undo records are overwritten in order from oldest to newest.

If there are no usable undo extents, then a check is performed in step 340 to determine whether undo retention is guaranteed. In one embodiment, undo retention is guaranteed for the entire undo tablespace (as defined by the configuration file 115). If undo retention is guaranteed for the entire undo tablespace and there are no usable undo extents (as determined in step 320), then an error is reported in step 360. Reporting an error may include sending a message to the entity that provided the undo information or to the entity that provided the database operations from which the undo information was generated. Alternatively, the error may be reported to a system administrator for the database server 110 or database 120 or the error may be written to a log.

In embodiments where the guarantee of undo retention is made per undo record, undo extent, or undo segment, a check is performed to determine whether there are any undo extents which do not have guaranteed undo retention. If undo retention is made based on a per-undo record basis, then a determination may be made whether there is an undo extent that contains only undo records that do not have guaranteed undo retention (step 340), and, if there is such an undo extent, then overwriting the undo records in the undo extent. If undo retention is guaranteed on a per undo-extent basis, then if (1) there is no usable undo extent (from step 320) and (2) there is an undo extent that does not have guaranteed undo retention (from step 340), then the undo records contained in the undo extent that does not have guaranteed undo retention are overwritten in step 350. If undo retention is guaranteed per undo segment, then if (1) there is no usable undo extent (from step 320) and (2) there is an undo segment that does not have guaranteed undo retention (herein referred to as the "unguaranteed undo segment") as determined in step 340, then an undo extent from the unguaranteed undo segment is overwritten with the new undo information. The choice of which undo extent in the unguaranteed undo segment to overwrite may be based on any appropriate factor, such as age of the undo extent. For example, the oldest undo extent in the undo segment may be chosen as the undo extent to overwrite. If undo retention is guaranteed on a per-tablespace basis, then any undo extent in any undo segment in an undo tablespace that does not have guaranteed undo retention may be chosen as the undo extent to overwrite in step 350. For example, the oldest undo extent in the undo tablespace may be chosen as the undo extent to overwrite in step 350.

EXAMPLE ALTERNATIVES AND BENEFITS

The techniques for guaranteed undo retention were described as having been performed at the database server 110. The techniques described herein are in no way limited to such an embodiment. The steps performed as part of the techniques for guaranteed undo retention may be performed by any appropriate process or set of processes. Furthermore, the steps depicted in FIG. 3A have a certain order depicted. The techniques described herein are in no way limited to those steps nor the particular order in which the steps are executed. For example, the steps may be executed in the order depicted in FIG. 3B.

Figure 3B:
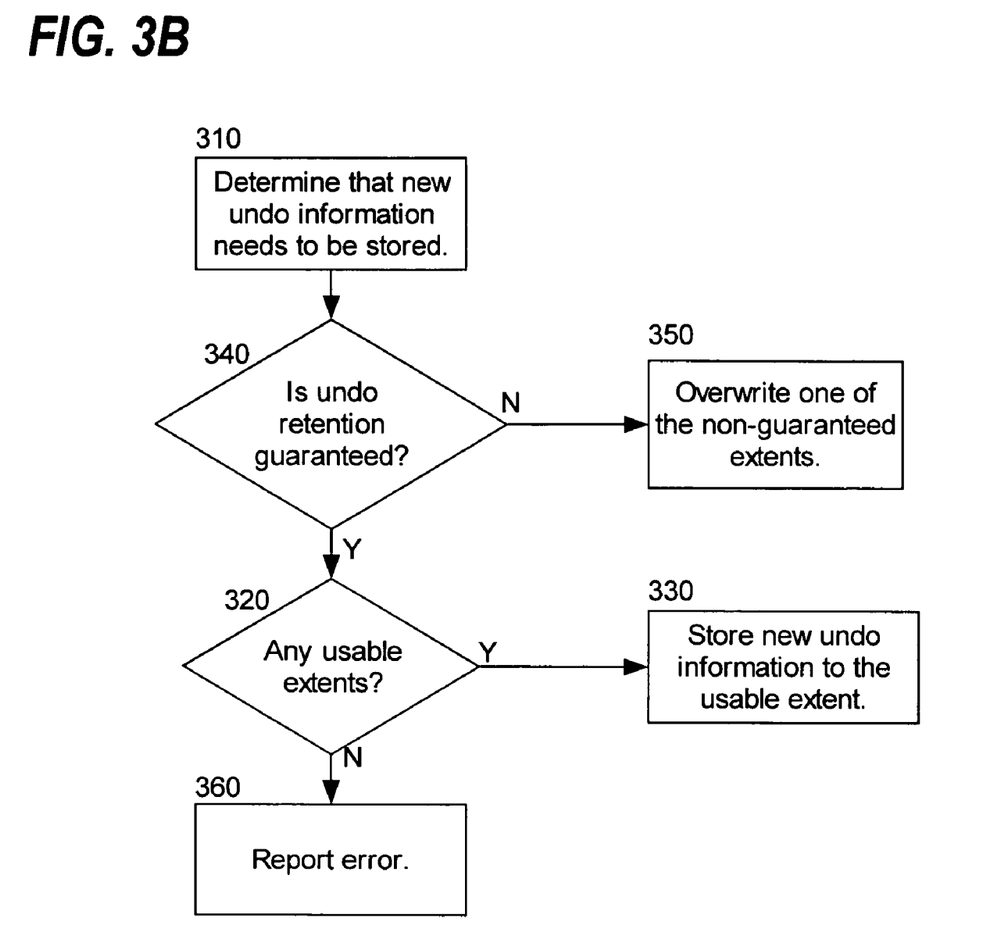
FIG. 3B is a flow diagram that depicts an "overwrite-first" technique for processing undo information.

FIG. 3B is a flow diagram that depicts an "overwrite-first" technique for processing undo information.

In FIG. 3B, once it is determined that new undo information needs to be stored (step 310), then a check may be made to determine whether undo retention is guaranteed (step 340). If undo retention is not guaranteed, then the new undo information stored by overwriting existing undo records (step 350). If undo retention is guaranteed, then a check is performed to determine whether there area any usable undo extents (step 320). If there are no usable undo extents, then an error is reported (step 360). If there are usable undo extents, then the new undo information is stored to the usable undo extent (step 330).

It is also possible that steps depicted in FIG. 3A and FIG. 3B are not excluded at all. For example, in one embodiment, step 360 may not be performed and instead, in the case where there is nowhere to store the new undo information, the new undo information is not stored and no indication of the error is reported.

Certain types of "usable" undo extents are described. The techniques described herein are in no way limited to those types of usable undo extents. For example, an undo extent that contains undo records that are going to expire within a predefined amount of time may also be considered usable. That is, it may be beneficial to consider as usable any extent that is "about to" expire.

The techniques described herein have numerous advantages over the prior art. Some embodiments and configurations of the techniques described herein provide means for reusing expired undo extents while still guaranteeing that unexpired undo extents are not overwritten. The "find usable extents first" technique may be beneficial in that guaranteed undo information is available for at least the predefined expiration time while, at the same time, the disk space used to store the undo information is kept low and even unguaranteed undo information is kept for at least its expiration time as long as there are other extents available.

The "overwrite first" technique may be beneficial in that guaranteed undo information is available for at least the predefined expiration time and the disk space used to store undo information is kept even lower than in a "find usable extents first" embodiment since unguaranteed undo extents are overwritten before any new undo extents are used.

Hardware Overview

Figure 4:
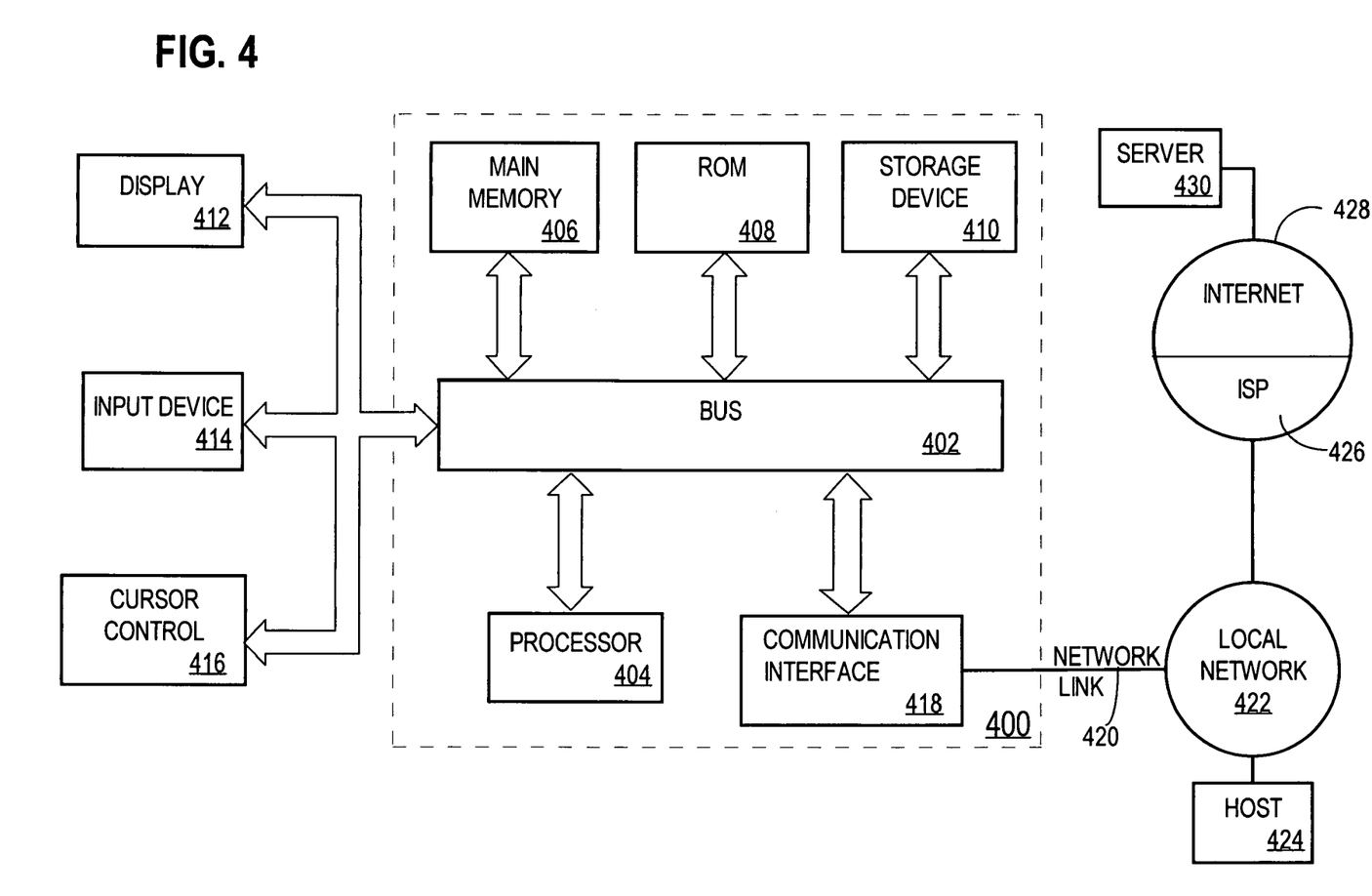
FIG. 4 is a block diagram that illustrates a computer system upon which an embodiment of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infrared data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method of retaining undo information, comprising:
   storing data that indicates whether or not undo records have guaranteed undo retention, wherein the undo records include a first subset of undo records that have guaranteed undo retention and a second subset of undo records that do not have guaranteed undo retention;
   wherein each undo record of the second subset of undo records can be overwritten before an expiration time associated with said each undo record has elapsed;
   determining that there is new undo information to be stored;
   wherein the undo information indicates undo operations which, when performed, reverse changes made to data;
   determining whether there are any usable undo storage spaces;
   if there is a usable undo storage space, then storing the new undo information to the usable undo storage space; and
   if there is no usable undo storage space and if there is a particular undo storage space storing one or more undo records, from a set of undo records, that do not have guaranteed undo retention, then storing the new undo information to the particular undo storage space.

2. The method of claim 1, wherein the method further comprises:
   if there is no usable undo storage space and if all undo storage spaces store undo records that have guaranteed undo retention, then reporting an error.

3. The method of claim 2, wherein reporting the error comprises sending a message to an entity associated with the new undo information.

4. A machine-readable volatile or non-volatile medium storing one or more sequences of instructions which, when executed by one or more processors, causes the one or more processors to perform the method recited in claim 3.

5. A machine-readable volatile or non-volatile medium storing one or more sequences of instructions which, when executed by one or more processors, causes the one or more processors to perform the method recited in claim 2.

6. The method of claim 1, wherein:
determining whether there are any usable undo storage spaces comprises determining whether any undo storage spaces are currently storing an undo record from the set of undo records that is in a usable state; and
the undo record that is in a usable state is one of being unused and being expired.

7. A machine-readable volatile or non-volatile medium storing one or more sequences of instructions which, when executed by one or more processors, causes the one or more processors to perform the method recited in claim 6.

8. The method of claim 1, further comprising determining whether the set of undo records has guaranteed undo retention by checking a configuration file.

9. A machine-readable volatile or non-volatile medium storing one or more sequences of instructions which, when executed by one or more processors, causes the one or more processors to perform the method recited in claim 8.

10. The method of claim 1, further comprising determining whether the set of undo records has guaranteed undo retention by checking a database dictionary.

11. A machine-readable volatile or non-volatile medium storing one or more sequences of instructions which, when executed by one or more processors, causes the one or more processors to perform the method recited in claim 10.

12. The method of claim 1, wherein determining that there is new undo information comprises receiving undo information based on a completed transaction.

13. A machine-readable volatile or non-volatile medium storing one or more sequences of instructions which, when executed by one or more processors, causes the one or more processors to perform the method recited in claim 12.

14. The method of claim 1, wherein determining that there is new undo information comprises receiving undo information corresponding to an uncommitted database transaction.

15. A machine-readable volatile or non-volatile medium storing one or more sequences of instructions which, when executed by one or more processors, causes the one or more processors to perform the method recited in claim 14.

16. The method of claim 1, wherein the usable undo storage space stores an undo record that is in a usable state, the set of undo records comprises a first undo segment and a second undo segment, the first undo segment is distinct from the second undo segment, the usable undo storage space is associated with the first undo segment, the new undo information is associated with the second undo segment, and wherein the method further comprises:
if there is a usable undo storage space, then
disassociating the usable undo storage space from the first undo segment; and
associating the usable undo storage space with the second undo segment.

17. A machine-readable volatile or non-volatile medium storing one or more sequences of instructions which, when executed by one or more processors, causes the one or more processors to perform the method recited in claim 16.

18. The method of claim 1, wherein:
undo retention is not guaranteed and no undo storage space is currently storing an undo record in the set of undo records that is in a usable state,
the set of undo records comprises a first undo segment and a second undo segment,
the first undo segment is distinct from the second undo segment,
the particular undo storage space is associated with the first undo segment,
the new undo information is associated with the second undo segment, and
the method further comprises:
if there is no usable undo storage space and if there is a particular undo storage space storing one or more undo records, from the set of undo records, that do not have guaranteed undo retention, then
disassociating the particular undo storage space from the first undo segment; and
associating the particular undo storage space with the second undo segment.

19. A machine-readable volatile or non-volatile medium storing one or more sequences of instructions which, when executed by one or more processors, causes the one or more processors to perform the method recited in claim 18.

20. The method of claim 1, wherein the method further comprises indicating as the particular undo storage space, an undo storage space associated with an oldest undo record in an undo segment, wherein the undo segment comprises the set of undo records.

21. A machine-readable volatile or non-volatile medium storing one or more sequences of instructions which, when executed by one or more processors, causes the one or more processors to perform the method recited in claim 20.

22. The method of claim 1, wherein the method further comprises indicating as the particular undo storage space, an undo storage space associated with an oldest undo record in the set of undo records.

23. A machine-readable volatile or non-volatile medium storing one or more sequences of instructions which, when executed by one or more processors, causes the one or more processors to perform the method recited in claim 22.

24. The method of claim 1, wherein the set of undo records is included in one or more undo segments, and wherein each particular undo segment of the one or more undo segments is associated with one or more undo storage spaces that are ordered by the time in which the one or more undo storage spaces were updated.

25. The method of claim 24, wherein determining whether there are any usable undo storage spaces comprises determining whether any undo storage spaces are currently storing an undo record from the set of undo records that is in a usable state by determining, for each undo segment in the one or more undo segments, whether any undo storage space is currently storing an undo record in the set of undo records that is expired.

26. The method of claim 25, wherein undo storage spaces in an undo segment are ordered cyclically and wherein an oldest undo storage space, which was updated longest ago, is immediately after a youngest undo storage space, which was updated most recently, in the cyclic ordering; and wherein a high-water-mark pointer points to the youngest undo storage space; and wherein determining whether any undo storage space is currently storing an undo record in the set of undo records that is expired comprises checking only the undo storage space after the undo storage space pointed to by the high-water-mark pointer.

27. A machine-readable volatile or non-volatile medium storing one or more sequences of instructions which, when executed by one or more processors, causes the one or more processors to perform the method recited in claim 26.

28. A machine-readable volatile or non-volatile medium storing one or more sequences of instructions which, when executed by one or more processors, causes the one or more processors to perform the method recited in claim 25.

29. A machine-readable volatile or non-volatile medium storing one or more sequences of instructions which, when executed by one or more processors, causes the one or more processors to perform the method recited in claim 24.

30. A machine-readable volatile or non-volatile medium storing one or more sequences of instructions which, when executed by one or more processors, causes the one or more processors to perform the method recited in claim 1.

31. A computer-implemented method of retaining undo information, comprising:
- storing data that indicates whether or not undo records have guaranteed undo retention, wherein the undo records include a first subset of undo records that have guaranteed undo retention and a second subset of undo records that do not have guaranteed undo retention;
- wherein each undo record of the second subset of undo records can be overwritten before an expiration time associated with said each undo record has elapsed;
- determining that there is new undo information to be stored;
- wherein the undo information indicates undo operations which, when performed, reverse changes made to data;
- if undo retention is not guaranteed for a set of undo records, then:
  - selecting a particular undo storage space that currently contains a first undo record of the set of undo records; and
  - overwriting at least a portion of the first undo record by storing the new undo information to the particular undo storage space;
- if undo retention is guaranteed for the set of undo records, then:
  - determining whether there are any usable undo storage spaces, wherein the step of
    - determining whether there are any usable undo storage spaces comprises
    - performing at least one of:
    - determining whether any undo storage spaces are currently storing an undo record from the set of undo records that is in a usable state;
    - determining whether any undo storage spaces are empty; and
    - determining whether there are any undo storage spaces for which memory is allocatable and for which memory has not yet been allocated; and
  - if there is a usable undo storage space, then storing the new undo information to the usable undo storage space.

32. A machine-readable volatile or non-volatile medium storing one or more sequences of instructions which, when executed by one or more processors, causes the one or more processors to perform the method recited in claim 31.

33. A computer-implemented method of retaining undo information, comprising the steps of:
- storing data that indicates whether or not undo storage spaces, which store existing undo information, have guaranteed undo retention, wherein the undo storage spaces include a first subset of undo storage spaces that have guaranteed undo retention and a second subset of undo storage spaces that do not have guaranteed undo retention;
- wherein each undo storage space of the second subset of undo storage spaces can be overwritten before an expiration time associated with said each undo storage space has elapsed;
- determining that at least a portion of the existing undo information is to be overwritten by new undo information;
- wherein the existing undo information and the new undo information indicate undo operations which, when performed, reverse changes made to data;
- in response to determining that at least the portion of the existing undo information is to be overwritten, performing the steps of:
  - inspecting the data that indicates whether or not the undo storage spaces, which store the existing undo information, have guaranteed undo retention; and
  - selecting a particular undo storage space, of the undo storage spaces, that does not have guaranteed undo retention; and
  - overwriting the particular undo storage space with the new undo information.

34. The method of claim 33, wherein the step of determining that at least the portion of the existing undo information is to be overwritten by the new undo information is performed in response to determining that there is no usable undo storage space available.

35. A machine-readable volatile or non-volatile medium storing one or more sequences of instructions which, when executed by one or more processors, cause the one or more processors to perform the method recited in claim 34.

36. The method of claim 33, wherein the step of overwriting the particular undo storage space is performed without first checking to determine whether any usable undo storage space is available.

37. A machine-readable volatile or non-volatile medium storing one or more sequences of instructions which, when executed by one or more processors, cause the one or more processors to perform the method recited in claim 36.

38. The method of claim 33, wherein the undo storage spaces, which store the existing undo information, comprise any one of:
- one or more undo records;
- one or more undo extents; and
- one or more undo segments.

39. A machine-readable volatile or non-volatile medium storing one or more sequences of instructions which, when executed by one or more processors, cause the one or more processors to perform the method recited in claim 38.

40. A machine-readable volatile or non-volatile medium storing one or more sequences of instructions which, when executed by one or more processors, cause the one or more processors to perform the method recited in claim 33.

* * * * *